(No Model.) 2 Sheets—Sheet 1.

E. THOMSON.
SYSTEM OF DISTRIBUTING AND METERING ELECTRIC ENERGY.

No. 444,930. Patented Jan. 20, 1891.

WITNESSES.
A. F. Macdonald
Wm. F. Capes

INVENTOR.
Elihu Thomson
By H. C. Townsend
Atty

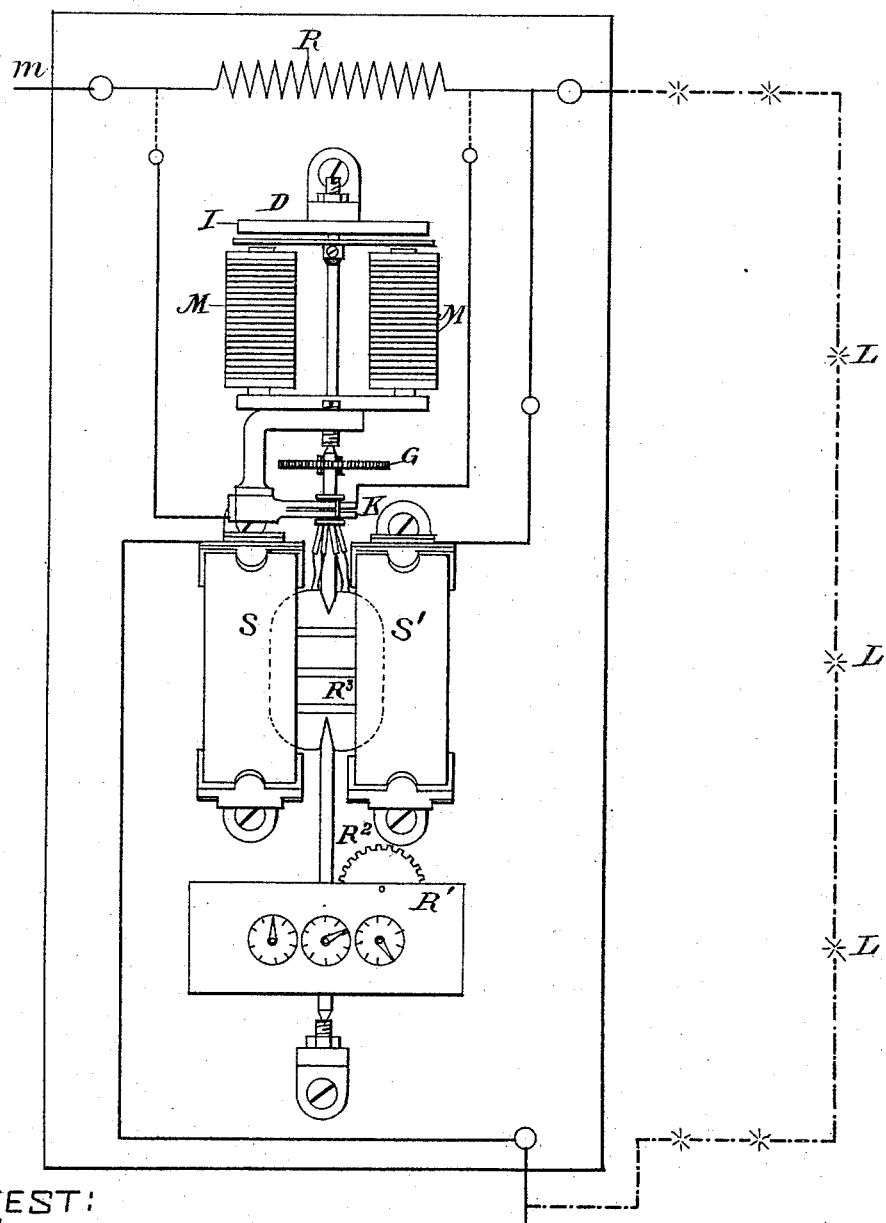

UNITED STATES PATENT OFFICE.

ELIHU THOMSON, OF SWAMPSCOTT, MASSACHUSETTS, ASSIGNOR TO THE THOMSON-HOUSTON ELECTRIC COMPANY, OF CONNECTICUT.

SYSTEM OF DISTRIBUTING AND METERING ELECTRIC ENERGY.

SPECIFICATION forming part of Letters Patent No. 444,930, dated January 20, 1891.

Application filed September 22, 1890. Serial No. 365,759. (No model.)

*To all whom it may concern:*

Be it known that I, ELIHU THOMSON, a citizen of the United States, and a resident of Swampscott, in the county of Essex and State of Massachusetts, have invented a certain new and useful System of Distributing and Metering Electric Energy, of which the following is a specification.

My present invention relates to a system of distribution for series or constant-current lines, where arc lamps or incandescent lamps or other translating devices are used in series.

The object of my invention is to enable a metering or measuring of the amount of energy used at different points on such lines to be effected. For this purpose I place each lamp or each set of lamps or other translating devices the supply of energy to which is to be measured in a loop of the main circuit, and I place across each loop or branch of the main circuit a meter or metering device in such a manner that a registry not of the current flowing on the line is obtained, but a registry of the voltage difference at the ends of the loop. The voltage of the lamps being known, account may thus be taken of the number of lamps used in series in each loop or the aggregate period of use by virtually making a registry of the volt-hours.

A meter for use in my system should be a meter which responds in its readings to the voltage difference between the two legs of the loop, and I prefer to limit this voltage difference to, say, five hundred volts, so that the meter should read in voltage or indicate the time the voltage was in use up to, say, five hundred volts, and down to, say, twenty volts. In this system, therefore, I secure the advantage of supplying energy with a series line, which is manifestly the best type of arc-light system, as demanding very small conductors, and at the same time I am enabled to make a charge for the light or meter consumption accurately. At the same time I may apply the system to motors in series or to incandescent lamps running in series with arc lights or by themselves on a series system.

Figure 1:
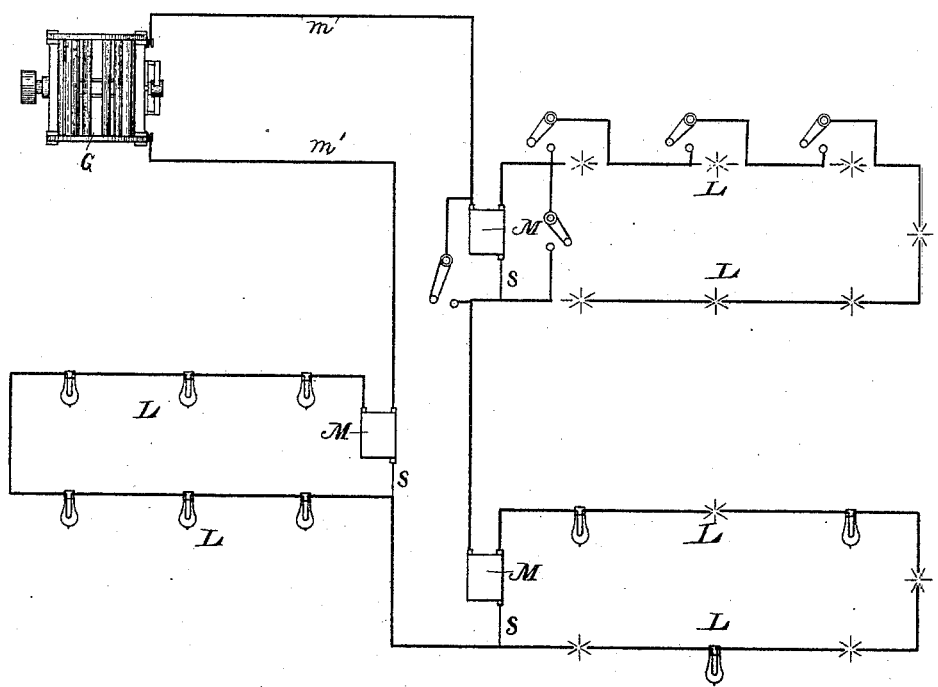
Figure 2:
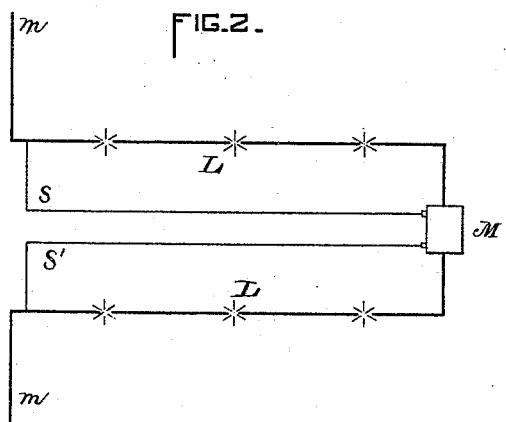

In the accompanying drawings, Figures 1 and 2 are diagrams illustrating the invention. Fig. 3 illustrates a form of registry device that may be employed.

In Fig. 1, G is a generator supplying the line $m\ m'$, from which loops are taken, as shown, on the circuit from one terminal of the generator to the other. In these loops lights L L L L, which may be incandescent lamps or arc lamps, or even other translating devices, such as motors, are employed in the ordinary way, and they may be located in stores, as usual, or in other buildings. Across the terminals of the loops, or otherwise connected to such loops so as to be responsive to the voltage difference at the terminals of the lamp or lamps or other translating devices, are placed the meters M for keeping a registry of the voltage difference.

As shown in Fig. 2, the meter might be located in the loop, provided the circuit-wires which indicate the voltage are carried to the meter from the points of diversion of the loop from the mains $m\ m'$. I have shown the main current as passing into the meter, and I do this for the purpose of illustration, as it may be utilized to propel or cause rotation to take place in the integrating or counting devices of the meter, more particularly as I have devised a meter which is especially adapted to this purpose and which has the main current passing through it, as well as the derived or shunt circuit across the loop. The main current as used in such meter, is not an essential part of my invention, but serves the purpose of any exciting-current or source which is of practically constant effect. Such a form of meter I have indicated in skeleton in Fig. 3 simply to illustrate one form of meter that might be used in carrying out my present invention. Any means may be, however, used for registering the voltage difference without departing from my invention, which consists, essentially, in a system of distribution and registry or metering of currents supplied to consumers, comprising a series or constant-current circuit, from which loops are taken to supply the lamps or other translating devices and any desired means of keeping a registry of the voltage differences at the terminal of the loops. Of course it will be understood that each of the loops may have around the translating devices shunting-switches, as indicated, whereby a number of the lights may be cut out, and, further, that each loop may have a shunting-switch by which the entire consumption may be stopped, shunting the loop so as to entirely check the consumption of energy on the loop.

Reference will now be made, briefly, to the parts indicated in Fig. 3 and described and claimed in an application for patent filed by by me of even date herewith, Serial No. 365,760. S S' are the field-magnet coils of an electric motor, and $R^3$ is the armature thereof. The coils S S' are placed in a branch of high resistance around the lights L L, so that they will be traversed by a current varying with the variations in the differences of potential at the terminals of the motor. In the field produced by these coils moves a motor-armature $R^3$, the commutator of which is indicated at K, and which motor-armature is included in a circuit in which a substantially-constant current will flow. Such constant current may be supplied by taking current from the main circuit into a branch around an artificial resistance R. A check on the rotation, which is comparatively constant, but which will increase proportionately with the speed of rotation, is provided by a disk D of copper, which is caused to rotate in a magnetic field produced by means of a magnet M. The disk is rotated through a gear G, connecting the armature-shaft with the shaft carrying the disk. An armature I is fixed in position above the disk. By this arrangement the armature revolves in a field, which is strengthened or weakened in accordance with the number of lights in use at any time, and as the armature rotates a registry of the number of its rotations is obtained by the register R', the resistance R being so adapted as to give a requisite rate for registering a number of units on the dial R' proportionate to the volt-hours or any other proper unit adopted. When the difference of potential at the terminals of the loop is increased by increasing the number of translating devices in series, the rotation is proportionately more rapid and the indications increased proportionately. If the loop be shunted or if the lights be extinguished by shunting, the meter ceases registering, no rotation of the armature and disk taking place. The rate of registry will be obviously proportional to the number of lamps in use.

What I claim as my invention is—

1. The herein-described system of electrical distribution, comprising a constant-current or series circuit adapted to operate translating devices in series, a loop of such circuit containing the translating devices, and means for keeping a registry of the voltage difference at the terminals of said loop, as and for the purpose described.

2. The herein-described method of measuring the electricity employed by translating devices on a constant-current circuit, consisting in making a registry of the voltage difference at the terminals of a loop upon which said devices are established.

Signed at Lynn, in the county of Essex and State of Massachusetts, this 18th day of September, A. D. 1890.

ELIHU THOMSON.

Witnesses:
   JOHN W. GIBBONEY,
   JOHN T. BRODERICK.